US007647581B2

(12) United States Patent
Atkin et al.

(10) Patent No.: US 7,647,581 B2
(45) Date of Patent: Jan. 12, 2010

(54) EVALUATING JAVA OBJECTS ACROSS DIFFERENT VIRTUAL MACHINE VENDORS

(75) Inventors: Steven Edward Atkin, Austin, TX (US); Margot Bruce Casey, Austin, TX (US); Tyron Jerrod Stading, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 10/881,969

(22) Filed: Jun. 30, 2004

(65) Prior Publication Data
US 2006/0005161 A1 Jan. 5, 2006

(51) Int. Cl.
*G06F 9/44* (2006.01)

(52) U.S. Cl. .................. 717/118; 717/116; 717/122; 717/126

(58) Field of Classification Search .................. 717/116, 717/118, 126, 123, 131, 133, 166
See application file for complete search history.

(56) References Cited

U.S. PATENT DOCUMENTS

| | | | | |
|---|---|---|---|---|
| 5,966,702 A * | 10/1999 | Fresko et al. | ................... | 707/1 |
| 6,070,239 A * | 5/2000 | McManis | ................... | 713/187 |
| 6,118,940 A * | 9/2000 | Alexander et al. | .......... | 717/127 |
| 6,247,171 B1 * | 6/2001 | Yellin et al. | ................... | 717/126 |
| 6,282,698 B1 * | 8/2001 | Baker et al. | ................... | 717/118 |
| 6,295,643 B1 * | 9/2001 | Brown et al. | ................... | 717/148 |
| 6,298,353 B1 * | 10/2001 | Apte | ................... | 707/103 R |
| 6,418,444 B1 * | 7/2002 | Raduchel et al. | ......... | 707/103 Z |
| 6,865,730 B1 * | 3/2005 | Burke et al. | ................ | 717/116 |
| 6,950,932 B1 * | 9/2005 | Lavian et al. | ................ | 713/151 |
| 7,007,270 B2 * | 2/2006 | Martin et al. | ................ | 717/131 |
| 7,181,725 B1 * | 2/2007 | Posegga et al. | ............ | 717/118 |
| 7,320,129 B2 * | 1/2008 | Talwar et al. | ................... | 718/1 |
| 2003/0079213 A1 * | 4/2003 | Cabillic et al. | ............. | 717/158 |
| 2004/0010785 A1 * | 1/2004 | Chauvel et al. | ............. | 717/158 |
| 2004/0031020 A1 * | 2/2004 | Berry et al. | ................. | 717/130 |
| 2004/0073899 A1 * | 4/2004 | Luk et al. | ................... | 717/158 |
| 2005/0050531 A1 * | 3/2005 | Lee | ................... | 717/153 |
| 2005/0066283 A1 * | 3/2005 | Kanamaru | ................. | 715/749 |
| 2005/0071810 A1 * | 3/2005 | Sutter et al. | ................. | 717/116 |
| 2005/0188356 A1 * | 8/2005 | Lwo | ................... | 717/120 |

* cited by examiner

*Primary Examiner*—Tuan Q Dam
*Assistant Examiner*—Isaac T Tecklu
(74) *Attorney, Agent, or Firm*—Dillon & Yudell LLP

(57) ABSTRACT

An analysis tool extracts class data from Java objects originating from multiple vendors having a particular design specification. A database mining tool then creates training data from the extracted class data to create a definition of objects associated with the particular design specification. Various implementations of the defined classes are compared across various performance metrics, which are output for the program designer as a function of vendor. The designer then selects the best design choices based on the best practices of multiple vendors disclosed by the outputs of the analysis tool when implementing a new Java program.

7 Claims, 12 Drawing Sheets

X axis = Method Signture
Y axis = Matching Byte Codes

| Vendor | Class | Method | # Lines | # Native Calls | # Try/ Catch blocks | Referred Classes | ... |
|---|---|---|---|---|---|---|---|
| Vendor1 | ClassLoader | findClass | 54 | 3 | 1 | 4 | |
| Vendor2 | ClassLoader | findClass | 135 | 2 | 5 | 5 | |
| Vendor3 | ClassLoader | findClass | 89 | 2 | 3 | 2 | |

EVALUATING JAVA OBJECTS ACROSS DIFFERENT VIRTUAL MACHINE VENDORS

CROSS-REFERENCE TO RELATED APPLICATIONS

The present application is related to the following co-pending U.S. patent applications filed on even date herewith, and incorporated herein by reference in their entirety:

Ser. No. 10/881,967, entitled "METHOD, SYSTEM AND PROGRAM PRODUCT FOR DETERMINING STANDARD JAVA OBJECTS"

Ser. No. 10/881,973, entitled "METHOD, SYSTEM AND PROGRAM PRODUCT FOR DETERMINING JAVA SOFTWARE CODE PLAGIARISM AND INFRINGEMENT"

Ser. No. 10/881,968, entitled "METHOD, SYSTEM AND PROGRAM PRODUCT FOR OPTIMIZING JAVA APPLICATION PERFORMANCE THROUGH DATA MINING"

BACKGROUND OF THE INVENTION

1. Field of the Invention

The present invention relates to computer systems, software architectures and programs, and more particularly to a method, system and computer program product for evaluating Java programs.

2. Description of the Related Art

Java is a robust, portable object-oriented programming language developed by Sun Microsystems, Inc., that is gaining wide acceptance for writing code for the Internet and World Wide Web (hereinafter, "Web"). Java attains its portability through use of a specially-designed virtual machine ("VM"). This virtual machine is also referred to as a "Java Virtual Machine", or "JVM". The virtual machine isolates the details of the underlying hardware from the compiler used to compile the Java programming instructions. The compiled code, referred to as Java "byte code", then runs on top of a JVM, where the JVM is tailored to a specific operating environment.

The nature of Java programming allows designers to approach software solutions in many different ways. Based upon specifications and goals, each software vendor for a particular application will implement their solution slightly differently. For example, among the various JVM vendors, each emphasis their solution over others by noting particular advantages provided by their implementation such as faster performance or higher security. However, it is very difficult for Java programmers to learn where each vendor has chosen to optimize their particular implementation of a Java solution. It would be valuable for a software engineer or application writer to understand the strengths and weaknesses of each particular implementation of a Java program so that the solution with the best practices can be integrated or utilized in the application the programmer is designing. For example, it would be valuable for the application designer to understand the profile of various JVMs in order to select the one with the most appropriate best practices for packaging with the Java programmer's application.

SUMMARY OF THE INVENTION

In accordance with the present invention, improved methods, systems and articles of manufacture for evaluating Java objects to determine best practices across multiple vendors are disclosed. In one embodiment of the present invention, an analysis tool extracts class data from Java objects originating from multiple vendors having a particular design specification. A database mining tool then creates training data from the extracted class data to create a definition of objects associated with the particular design specification. Various implementations of the defined classes are compared across various performance metrics, which are output for the program designer as a function of vendor. The designer then selects the best design choices based on the best practices of multiple vendors disclosed by the outputs of the analysis tool when implementing a new Java program.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

In a preferred embodiment, statistical modeling is performed to obtain programming metrics on multiple implementations of a Java object. These programming metrics are then evaluated and compared to determine how the different vendors implemented similar functionality within their solutions. This information is then utilized to program a Java application that takes advantage of the best practices across multiple vendors when using the Java object as part of the programmer's solution. The function of a tool for performing this modeling and analysis in a typical software environment is described below.

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a Java software system, it will be appreciated that the present invention is not limited to Java implementations.

Figure 1:
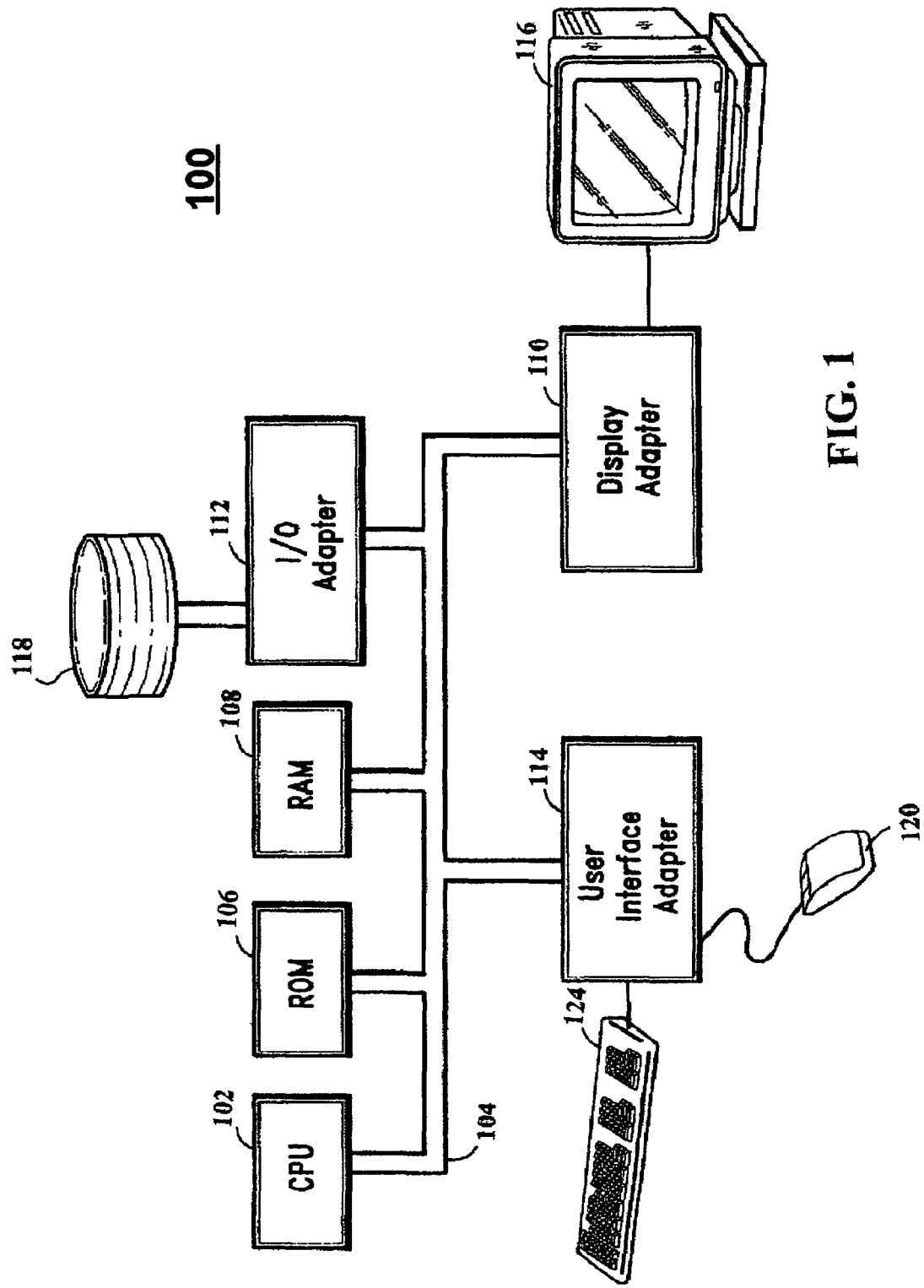
FIG. 1 is a block diagram of a general-purpose computer system to which the present invention may be applied.

FIG. 1 is a block diagram of a general-purpose computer system 100 to which the present invention may be applied. The computer system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are coupled to system bus 104.

Display adapter 110 operatively couples a display device 116 to system bus 104. A disk storage device (e.g., a magnetic or optical disk storage device) 118 is operatively coupled to system bus 104 by I/O adapter 112. User interface adapter 114 operatively couples a mouse 120 and keyboard 124 to system bus 104. One or more objects are created when an Object-Oriented Program (not shown) is executed in computer system 100.

The present invention has particular utility in Java applications. Java is a robust, portable object-oriented programming language developed by Sun Microsystems, Inc. Java attains its portability through use of a virtual machine or "Java Virtual Machine", or "JVM". The JVM enables isolating the details of the underlying hardware from the compiler used to compile the Java programming instructions.

Java applications are typically constructed using a development toolkit such as the "JDK" (Java Development Kit) product from Sun Microsystems, and are executed using the "JRE" (Java Runtime Environment) product, also from Sun Microsystems. Programs are executed from the command line when using the JRE. The Java Runtime Environment includes the JVM, as well as a number of files and classes that are required to run Java applications or applets. Hereinafter, the terms "JVM" and "runtime environment" will be used interchangeably unless otherwise noted.

Java program source code typically consists of a set of class definitions stored in a series of text files. A Java class contains both methods and data. Java source code is compiled into binary code, referred to as Java "byte code." Byte codes are machine independent so that they can be executed on any machine's JVM, where the JVM is tailored to the specific operating environment. After the source code files are compiled into Java byte code class files, they are then typically loaded into memory by a class loader for interpretation by a JVM interpreter before the associated program is executed. Class loading can also occur when a Java program dynamically attempts to load another class at run time. The Java class loader uses a predetermined search strategy when locating class files, which gives precedence to particular locations. According to the Java 1.2 platform specification, the highest priority search locations are the bootstrap run time and internationalization classes in the JRE, named "rtjar" and "I18N.jar," respectively. The Java Archive (JAR) or ".jar" file is a repository that contains one or more Java class files and is simply called a "Java jar" or "JAR". JAR files provide compression, backward compatibility with existing Java applets, portability, and security features.

Figure 2A:
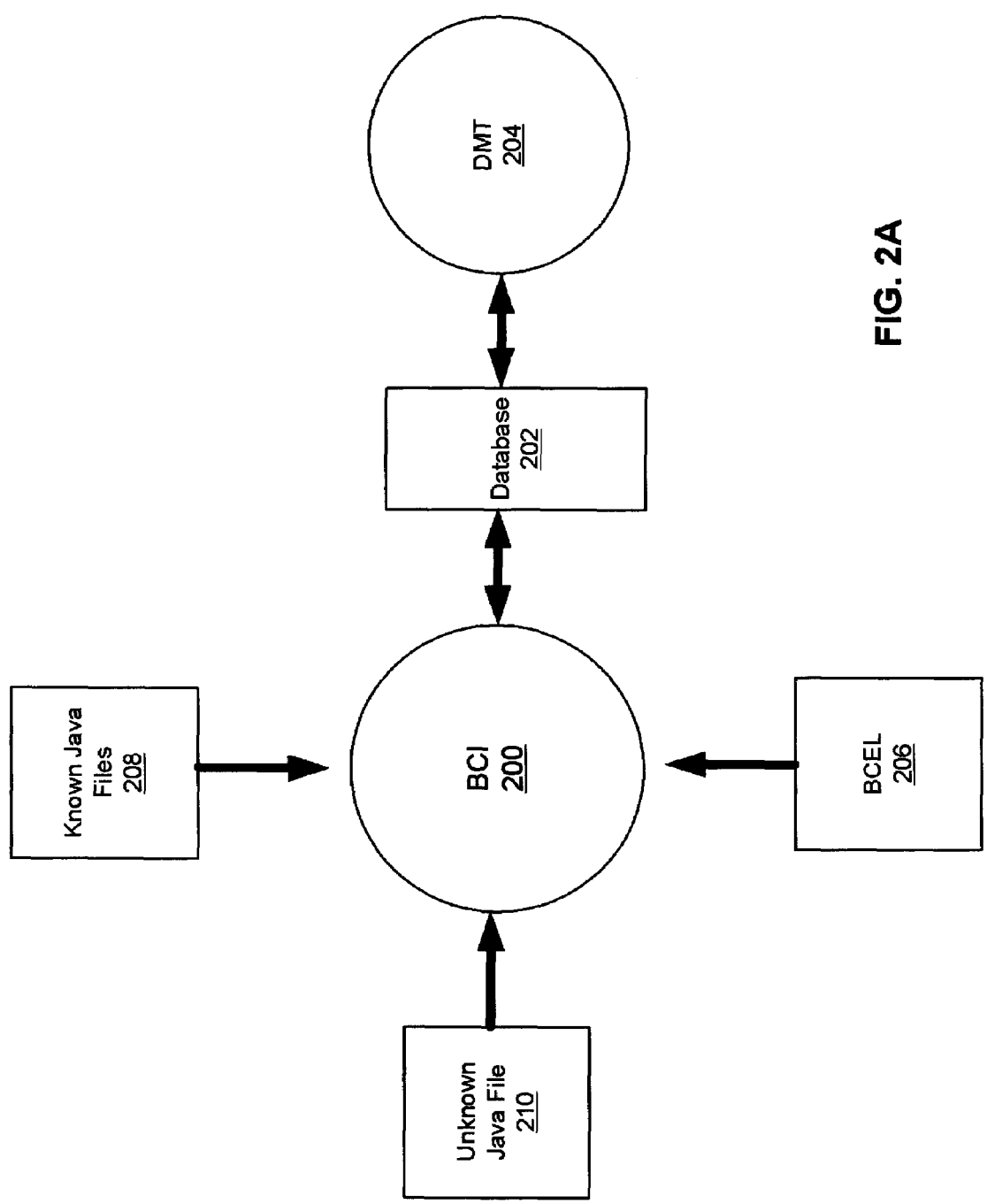
FIG. 2A a block diagram of a software architecture for system, in accordance with the preferred embodiment of the present invention.

With reference now to FIG. 2A, there is shown a block diagram of a software architecture for computer system 100, in accordance with the preferred embodiment of the present invention. In a preferred embodiment, an analysis tool written in Java, called the Byte Code Inspector (BCI) 200, is executing in CPU 102. BCI 200 accesses database 202, which is contained within disk storage device 118, for the storage and retrieval of analysis data. Database Mining Tool (DMT) 204 is also executing in CPU 102. In a preferred embodiment, a commercially available database mining tool such as Enterprise Miner produced by SAS, Inc. may implement DMT 204.

Figure 2B:
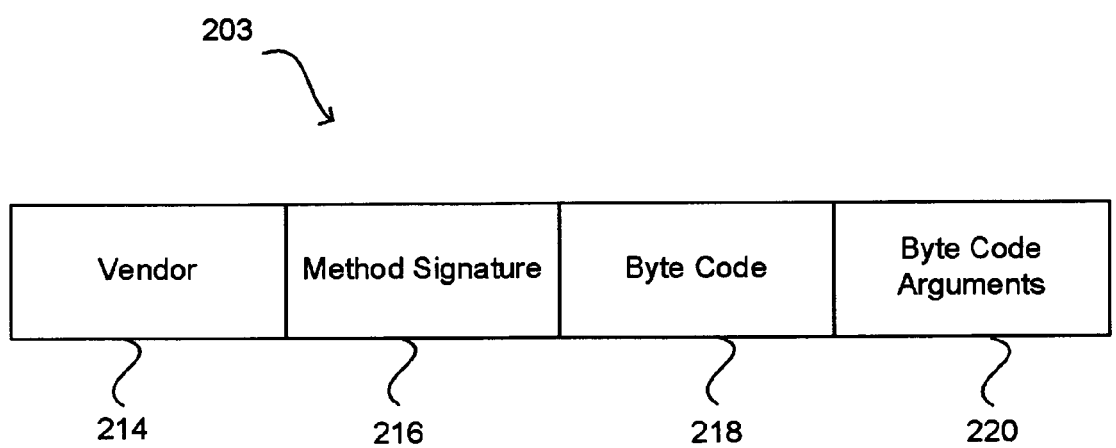
FIG. 2B is a logical block diagram of a Java file method entry in a database, in accordance with the preferred embodiment of the present invention.

BCI 200 decompiles a known Java class or JAR file (known Java files 208) to extract specific method information to be placed in database 202. FIG. 2B is a logical block diagram of a Java file method entry 203 in database 202. In a preferred embodiment, method entry 203 stores method information for a specific class of a Java file, including the vendor 214, method signature 216, byte code 218 and byte arguments 220. A number of method entries 203 are created in database 202 corresponding to each Java class contained in known Java files 208.

Figure 2C:
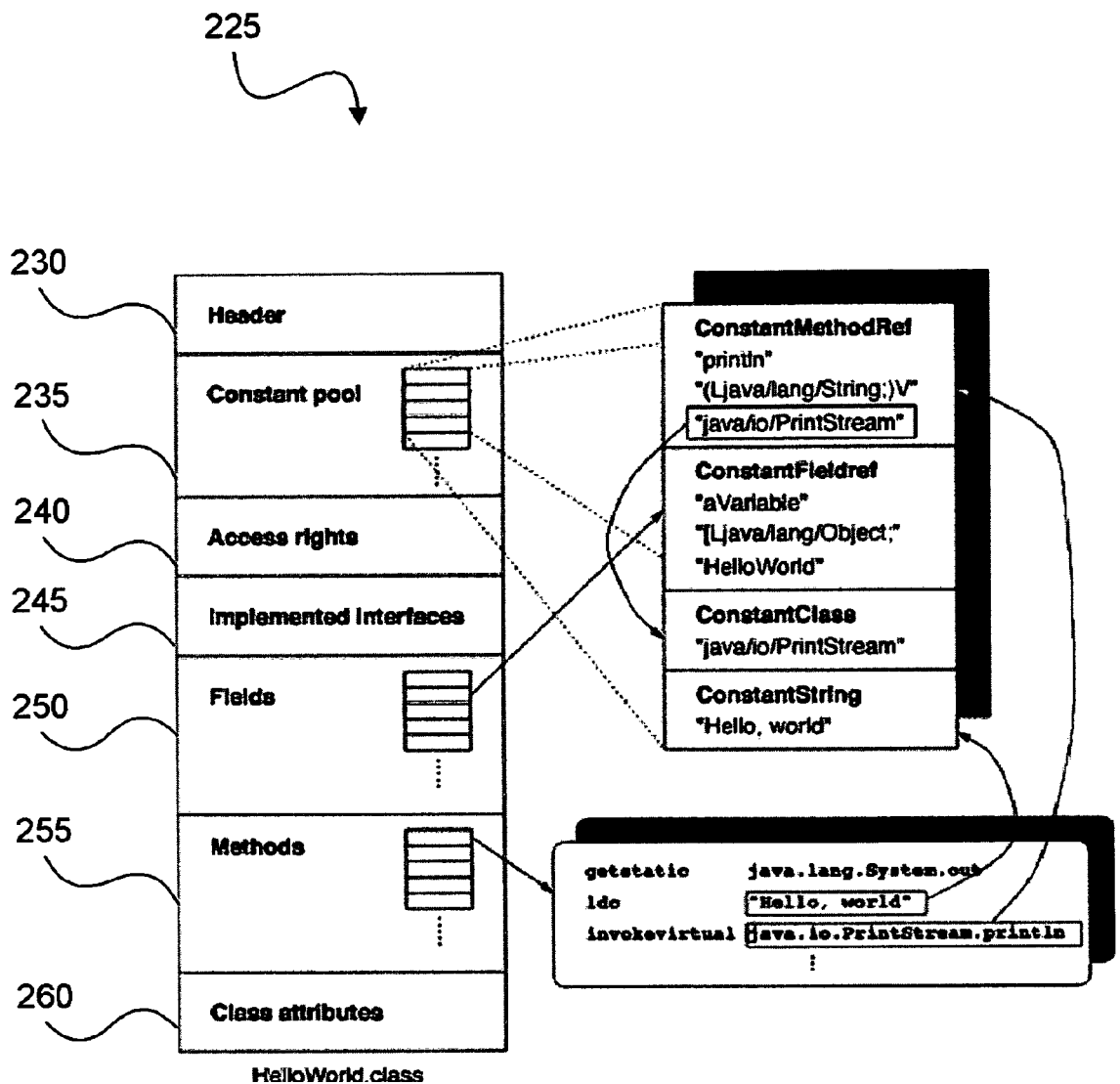
FIG. 2C shows a graphical representation of a Java class file as viewed by the Byte Code Engineering Library.

BCI 200 retrieves methods of a class being analyzed from a commercially available toolkit called the byte code engineering library (BCEL) 206. In a preferred embodiment, BCI 200 has been implemented using a publicly available byte code engineering library such as the open source Byte Code Engineering Library, which is available from The Apache Software Foundation on the Internet at http://jakarta.apache.org/index.html. This library is used to separate a Java class file into its constituent parts. FIG. 2C shows a graphical representation of a Java class file as viewed by the BCEL 206. As can be seen in FIG. 2C, the library separates the byte code for class 225 into various attributes, including a header 230, constant pool 235, access rights 240, implemented interfaces 245, fields 250, methods 255 and class attributes 260.

Figure 3:
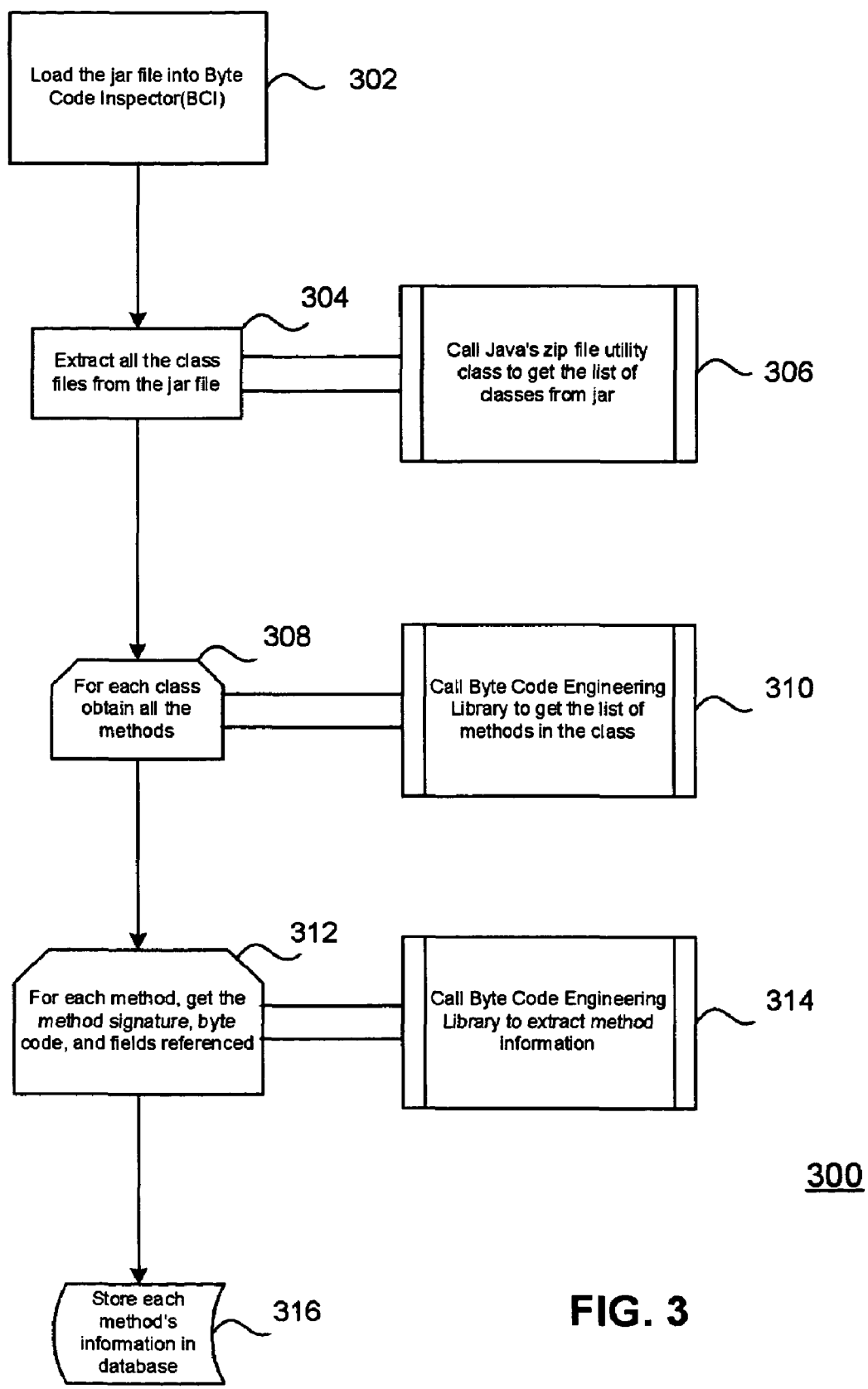
FIG. 3 is a flow diagram of a process for decompiling a Java archive that contains Java classes for use in the pre-analysis process, in accordance with the preferred embodiment of the present invention.

With reference now to FIG. 3, there is shown a flow diagram of a process implemented by BCI 200 for unpacking a Java archive for use in the pre-analysis process 500 (see FIG. 5), in accordance with the preferred embodiment of the present invention. As shown in FIG. 3, process 300 begins at step 302, when the user loads the known Java files 208 into BCI 200. At step 304, BCI 200 extracts all class files contained in the known Java files 208 by calling Java's zip file utility class (shown at 306) to obtain the list of classes from the known Java files 208. At step 308, BCI 200 obtains all methods for each class extracted from the known Java files 208 (at step 304) by calling the BCEL 206 to get the corresponding list of methods known to be contained within each class (shown at 310). At step 312, BCI 200 extracts the method signature, byte codes, byte arguments and other fields for each method (shown at 314) by calling the BCEL 206. Thereafter, process 300 ends at step 316, when BCI 200 stores the method information 214-220 for each method of each class extracted at step 312 in database 202 within method entry 203.

Figure 4:
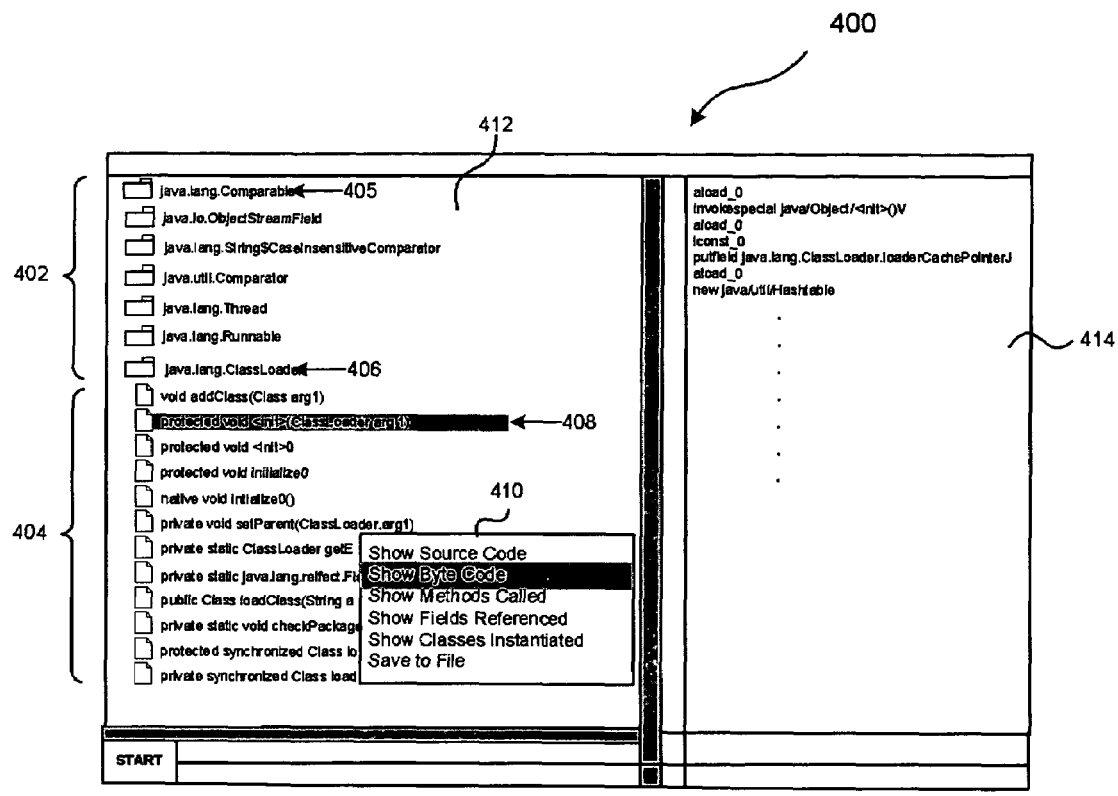
FIG. 4 shows a screen shot of the graphical user interface of the Byte Code Inspector tool, in accordance with the preferred embodiment of the present invention.

FIG. 4 shows a screen shot of the graphical user interface window (GUI) 400 of BCI 200. FIG. 4 shows an example where "rtjar" has been decompiled by BCI 200 to extract all class files 402 within the rtjar archive, and then to further extract all methods 404 within the class files 402. For example, the "java.lang.Comparable" 405 and "java.lang.ClassLoader" 406 class files 402 are shown within left windowpane 412. Additionally, the "java.lang.ClassLoader" class 406 is shown expanded in the GUI 400, thereby listing all of its methods 404 below the expanded class file 406. For example, the "protected void <init>(ClassLoader arg1)" method 408 is listed as one of the methods 404 of the ClassLoader class 406. All byte codes extracted from the user-selected method in the left hand windowpane 412 of the GUI 400 are listed in the right hand windowpane 414. For example, as shown in FIG. 4, if the user selects the "protected void <init>(ClassLoader arg1)" method 408 (e.g., using a mouse) the constituent byte codes are shown in the right hand windowpane 414.

Figure 5:
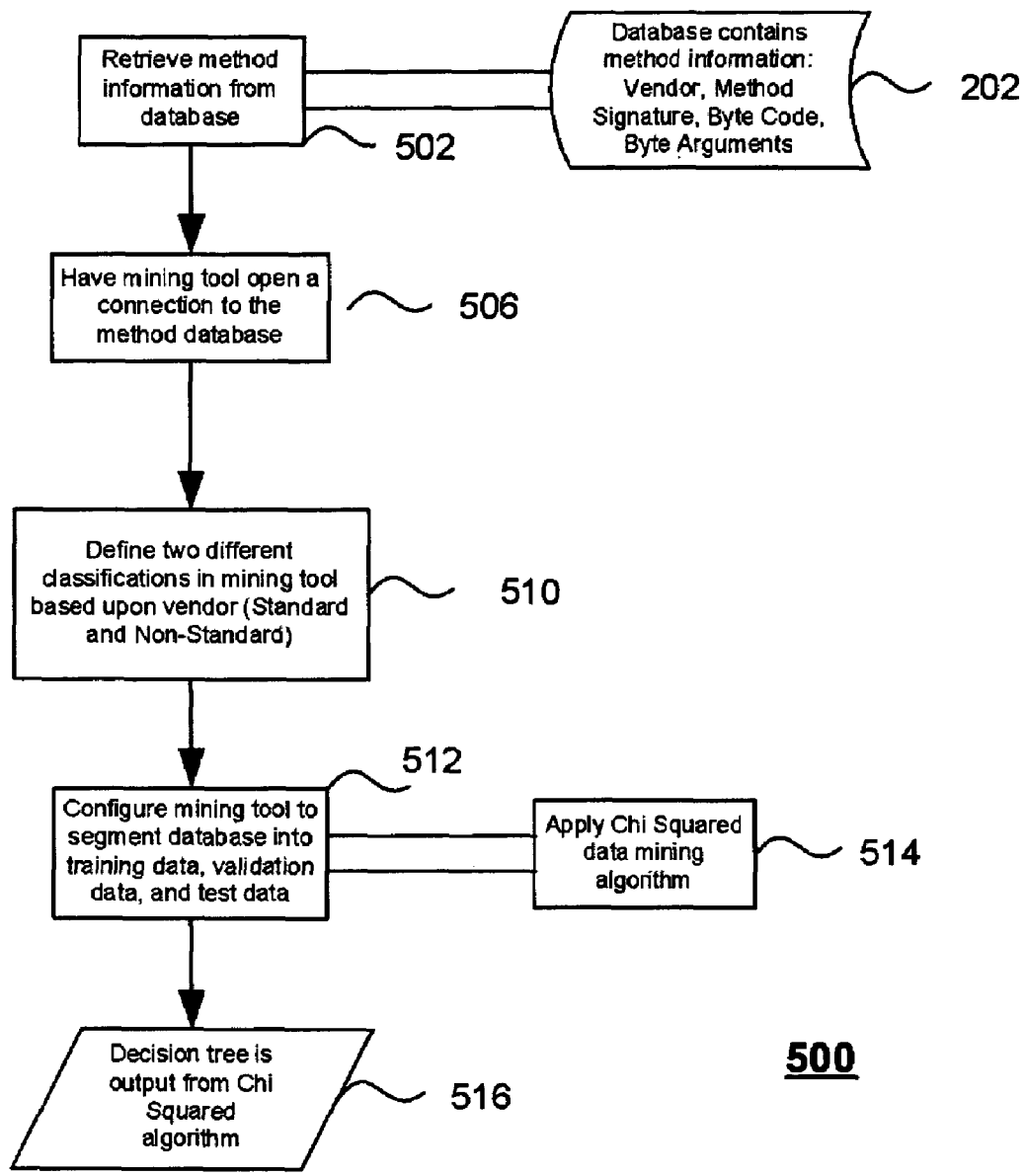
FIG. 5 shows a high-level flow diagram of the process of pre-analysis for the analysis tool, in accordance with the preferred embodiment of the present invention.

With reference now to FIG. 5, there is shown a high-level flow diagram of a process of pre-analysis, in accordance with the preferred embodiment of the present invention. Database Mining Tool (DMT) 204 performs a pre-analysis on a number of existing, known programs of the type being analyzed in order to learn what attributes are common among standard programs of this type. These attributes can then be tested in the unknown program to determine whether it is a standard or non-standard implementation. For example, if an analysis tool is being created to analyze a class loader of an unknown source, pre-analysis (as provided by process 500) is performed on a sampling of class loaders known to be standard and a sampling of class loaders known to be non-standard. As described in the preferred embodiment, pre-analysis of class loaders is performed by analyzing the rtjar files from a number of well-known JVMs.

Process 500 begins at step 502, where BCI 200 retrieves the method information 214-220 of the program type being analyzed and stores the method information in database 202 (as described in process 300). The user accesses database 202 to retrieve attribute information stored in method entry(ies) 203 such as the vendor 214, method signature 216, byte code 218, and byte arguments 220 for the Java program type being analyzed. At step 506, DMT 204 opens a connection to the database 202. At step 510, the user defines two different classifications to be associated with the class being analyzed within DMT 204. In a preferred embodiment, these classifications are based upon whether the Java class is considered a "standard" or "non-standard" implementation of the class. This definition of either "standard" or "non-standard" is created and adapted as seen fit by the user of DMT 204. In the preferred embodiment, the determination of whether a given implementation is standard or non-standard is based on a user-defined classification of the vendor for the class. In other implementations, different fields or attributes within the database could be specified as the classification field for determining standard or non-standard implementations for the purpose of analysis.

In an alternative preferred embodiment, an additional field within the database 202 may be included that is labeled as "standard" or "non-standard" by the user or by a person who is familiar with that program type. This preferred embodiment relieves the designer or user from the decision process of defining what implementation of the class is standard or non-standard. In yet another preferred embodiment, a particular implementation of a Java class is designated "standard" or "nonstandard" based on programmatic testing of the known Java files 208 or database 202.

With reference back to step 512 in FIG. 5, DMT 204 selects a random sample of the class type from among the method entries 203 in database 202, and segments the sample into three sets of data: training data, validation data, and test data. The training data is used to create a decision tree. The validation data is used to measure the validity of the decision tree, and the test data is used to measure the final results of the decision tree. DMT 204 applies a decision tree algorithm 514 to the sample method entry 203 in a top-down, recursive fashion such that the resulting decision tree 600 (see FIG. 6) starts as a single node with all the training samples included in it. If all the samples are of the same classification (i.e., standard or non-standard), then the node is a leaf node and is labeled with that classification. Otherwise, DMT 204 calculates a "chi-squared" statistical measure for each attribute in the training data to determine the "goodness" of a split on that attribute. The attribute with the best chi-squared measure is designated as the "decision" attribute at the node. This process is recursively iterated at each node of the decision tree 600 until there are no more attributes to split on. In a preferred embodiment, a database 202 consisting of multiple Java rtjar files extracted by BCI 200 is mined by creating a decision tree using the chi-squared measure of significance on the ClassLoader classes of the "Java.lang" package. The "Java.lang" package provides classes that are fundamental to the design of the Java programming language—the most important classes being "Object", which is the root of the class hierarchy, and "Class", instances of which represent classes at run time. Process 500 concludes at step 516, where a decision tree 600 (see FIG. 6) is output from DMT 204.

Figure 6:
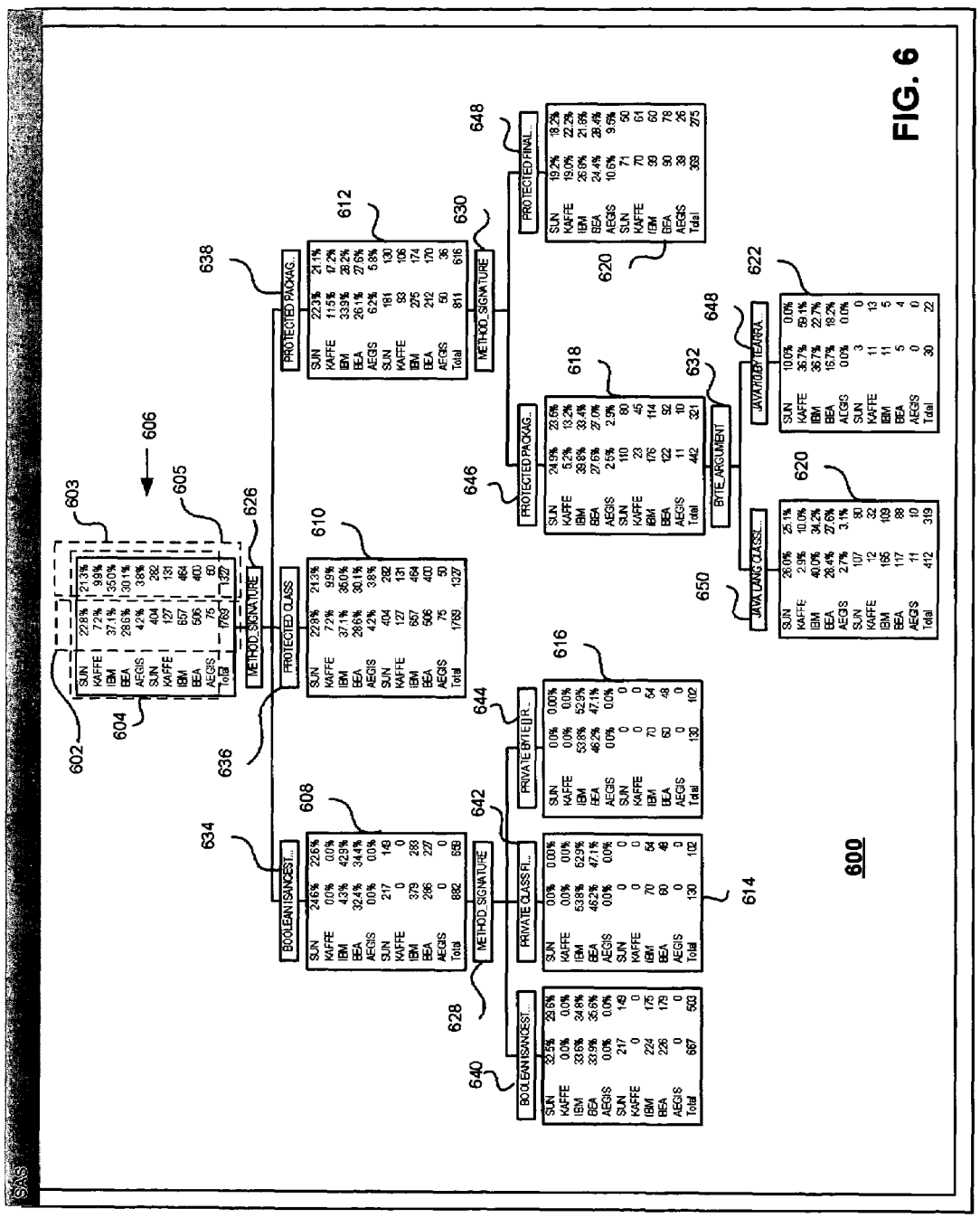
FIG. 6 shows a block diagram of the decision tree produced by the analysis tool, in accordance with the preferred embodiment of the present invention.

FIG. 6 shows a block diagram of the decision tree 600 produced by DMT 204, in accordance with the preferred embodiment of the present invention. Each node 606-622 within the decision tree 600 includes a listing of sampled vendors and indicates the amount of sampled data associated with that node. As seen within node 606, percentages and raw numbers are given for both the training data (column 602) and validation data (column 603) for each vendor's sampled data fitting into that category or node 606-622. For example, the root node 606 of decision tree 600 includes five entries (duplicated at reference numbers 604 and 605 for purposes of user analysis) for the sampled vendors. For the analysis shown in the example of FIG. 6, the vendors, IBM, BEA and SUN, are considered to have "standard" implementations of the "ClassLoader" class, and KAFFE and AEGIS are considered to have "non-standard" implementations of the "ClassLoader" class for purposes of training DMT 5204 and producing testing data.

In decision tree 600, the fields or attributes within database 202 that are the "decision" attributes at the nodes 606-622 of the tree are designated at 626-632. For example, key 626 indicates that the first node 602 of decision tree 600 used the method signature field in the database 202 to make the decision or split, and key 632 indicates that the last node in decision tree 600 used the byte argument field in database 202. Within decision tree 600, headers 634-650 indicate the type of method signature, byte codes or byte arguments used for the decision attribute at its node of the decision tree 600, thereby indicating all possible branches from that node. As will be appreciated, any field within the information extracted from the database 202 may be designated as a "decision" attribute within the decision tree 600 if it best identifies a standard implementation of the target class. In a preferred embodiment, the byte code, method signatures and byte arguments are used as the method information to generate the decision tree 600.

Figure 7:
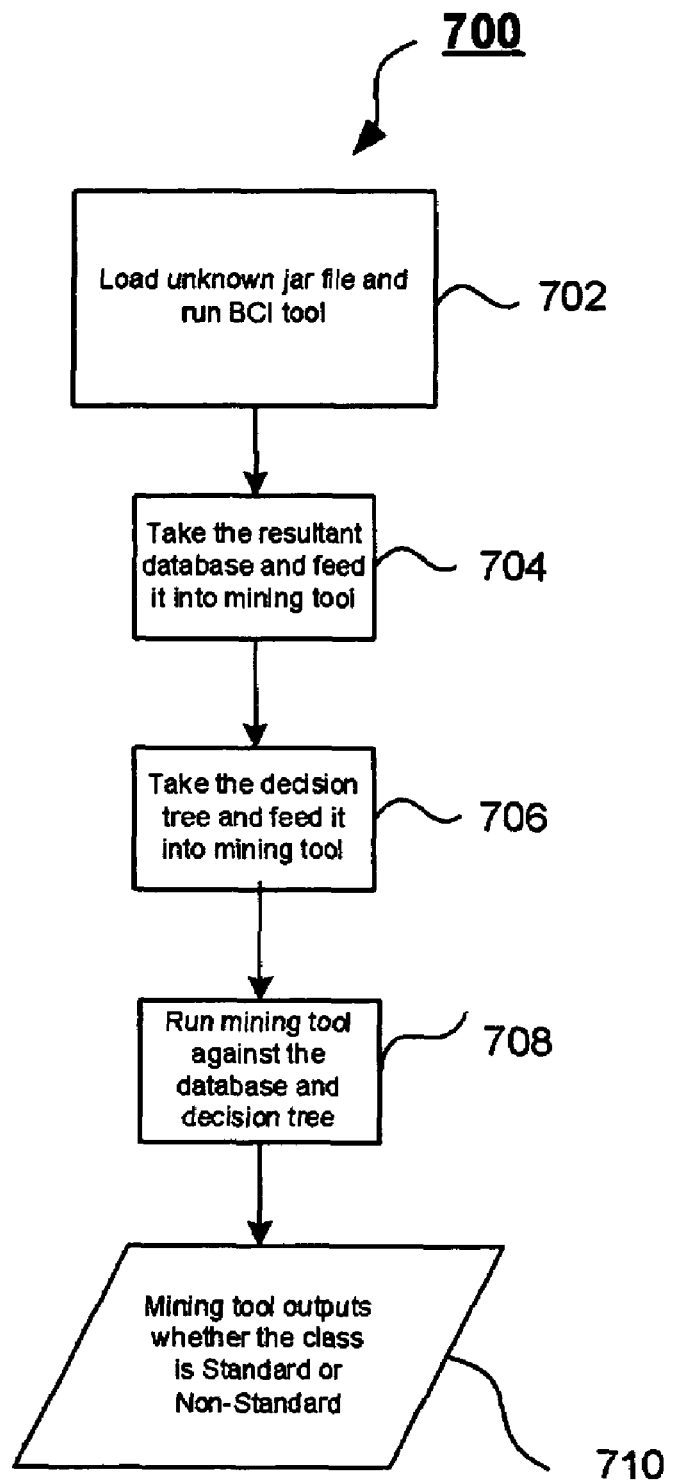
FIG. 7 shows a method for determining the classification of an unknown Java class as a standard or non-standard implementation of the selected class file, in accordance with the preferred embodiment of the present invention.

With reference now to FIG. 7, there is shown a method for determining the classification of an unknown Java archive as a standard or non-standard implementation of the selected class file, in accordance with the preferred embodiment of the present invention. Process 700 is performed by a user who has received an unknown JAR file (unknown Java file 210) and wants to determine if the received JAR file is "standard" or "non-standard" for its particular class. Process 700 begins at step 702, where the user loads the unknown Java file 210 into the user's computer system 100 and runs BCI 200 on the unknown Java file 210, which extracts the method information 212-220 from all applicable classes within the unknown Java file 210 and stores the information in a method entry 203 in association with unknown Java file 210 in database 202. In a preferred embodiment, the user uses BCI 200 to extract method signatures 216, byte code 218, and byte arguments 220 of a ClassLoader file in the unknown Java file 210 and stores them in database 202.

At step 704, DMT 204 reads the method entries 203 from database 202 for unknown Java file 210. At step 706, DMT 204 accesses a decision tree 600 developed in pre-analysis (process 500) for a set of known Java files 208 of the same type of class as the unknown Java file 210. For example, in the analysis of a ClassLoader, the decision tree 600 for ClassLoader is created from pre-analysis (process 500) of the standard and non-standard ClassLoaders. Thereafter, at step 708, DMT 204 uses the method information 214-220 extracted from the unknown Java file 210 and stored in database 202 as test data for the decision tree 600. This type of analysis comparison is well known to those skilled in the art and is a common feature on commercially available database mining tools (for example, SAS Enterprise Miner). DMT 204 then analyzes the "decision" attributes 626-648 previously used to build decision tree 600 with respect to the method information 214-220 extracted from the unknown Java file 210 to arrive at a statistical probability that the unknown Java file 210 falls within one of the leaf nodes 612-622 of decision tree 600. In pre-analysis (process 500) of the sampled database (known Java files 208), the user or programmer has designated each leaf node 612-622 as either "standard" or "non-standard" based on whether the user or programmer deems a particular leaf node as containing sufficient probabilities of standard implementations to be considered a "standard" path (step 512), thereby suggesting the conclusion that an unknown Java file 210 reaching that node in the analysis is within the class of "standard" or "non-standard" Java implementations, as applicable. Accordingly, at step 710, based on the programmer's pre-programmed designation of leaf nodes, and the resulting node at the end of the path within the decision tree 600 for unknown Java file 210, DMT 204 will output a determination that the extracted class of the unknown Java file 210 is considered either "standard" or "non-standard."

Figure 8:
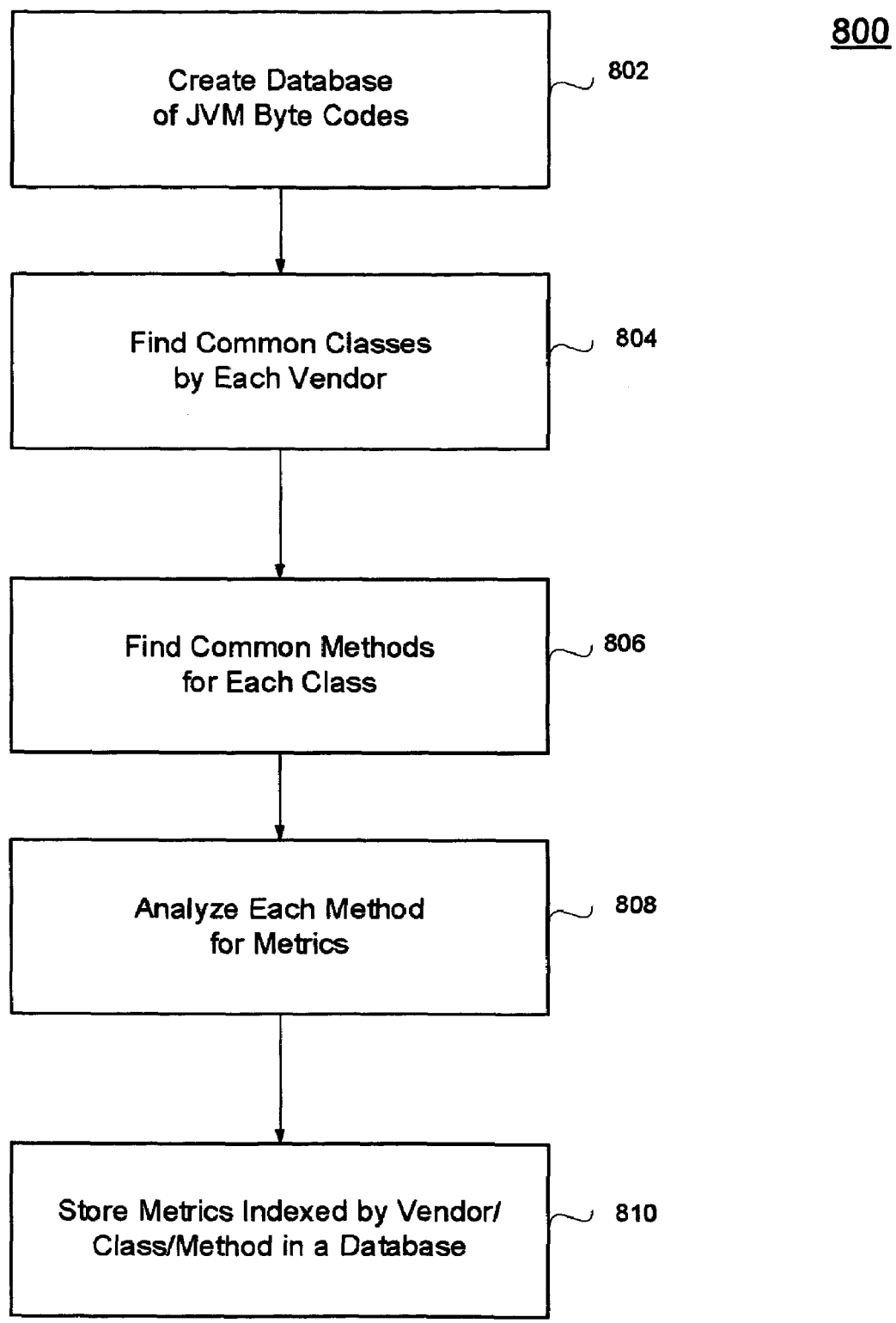
FIG. 8 shows a flow diagram of a process for evaluating multiple vendors' implementations of a Java class, in accordance with a preferred embodiment of the present invention.

With reference now to FIG. 8, there is shown a flow diagram of a process for evaluating multiple vendors' implementations of a Java class, in accordance with a preferred embodiment of the present invention. In this preferred embodiment, JVMs from different vendors are evaluated. Process 800 begins at step 802, where BCI 200 creates a database of JVM byte codes for each of the vendor implementations to be analyzed. In a preferred embodiment, a BCEL from an open source provider may be accessed to provide the byte code database. At step 804, BCI 200 determines one or more classes that are common to each of the vendors' solutions and extracts them from the JVM byte code database of BCEL 206. In a preferred embodiment, the "rtjar" for each implementation is accessed for step 804. Then, at step 806, BCI 200 finds all the methods that are common for each of the vendor implementations within each of the classes identified at step 804. At step 808, the program designer analyzes each of the methods found at step 806 for programming metrics of interest. Analysis is performed on design characteristics and performance metrics such as size of the code, security implemented, performance provided, etc. In a preferred embodiment, process 800 is performed on each vendor's implementation selected by the program designer as representing a particular design metric. At step 810, each of the analyzed classes, dependencies and metadata are stored in a database indexed by vendor, class and method. Here, using the BCEL 206, the byte codes of the found methods are broken into multiple pieces and method attributes are stored in association with each vendor in a database. Using this stored database, data mining algorithms and statistical analysis are used to determine the association between the Java code and the design features advertised by the vendor as is explained below in conjunction with FIG. 9.

Figure 9:
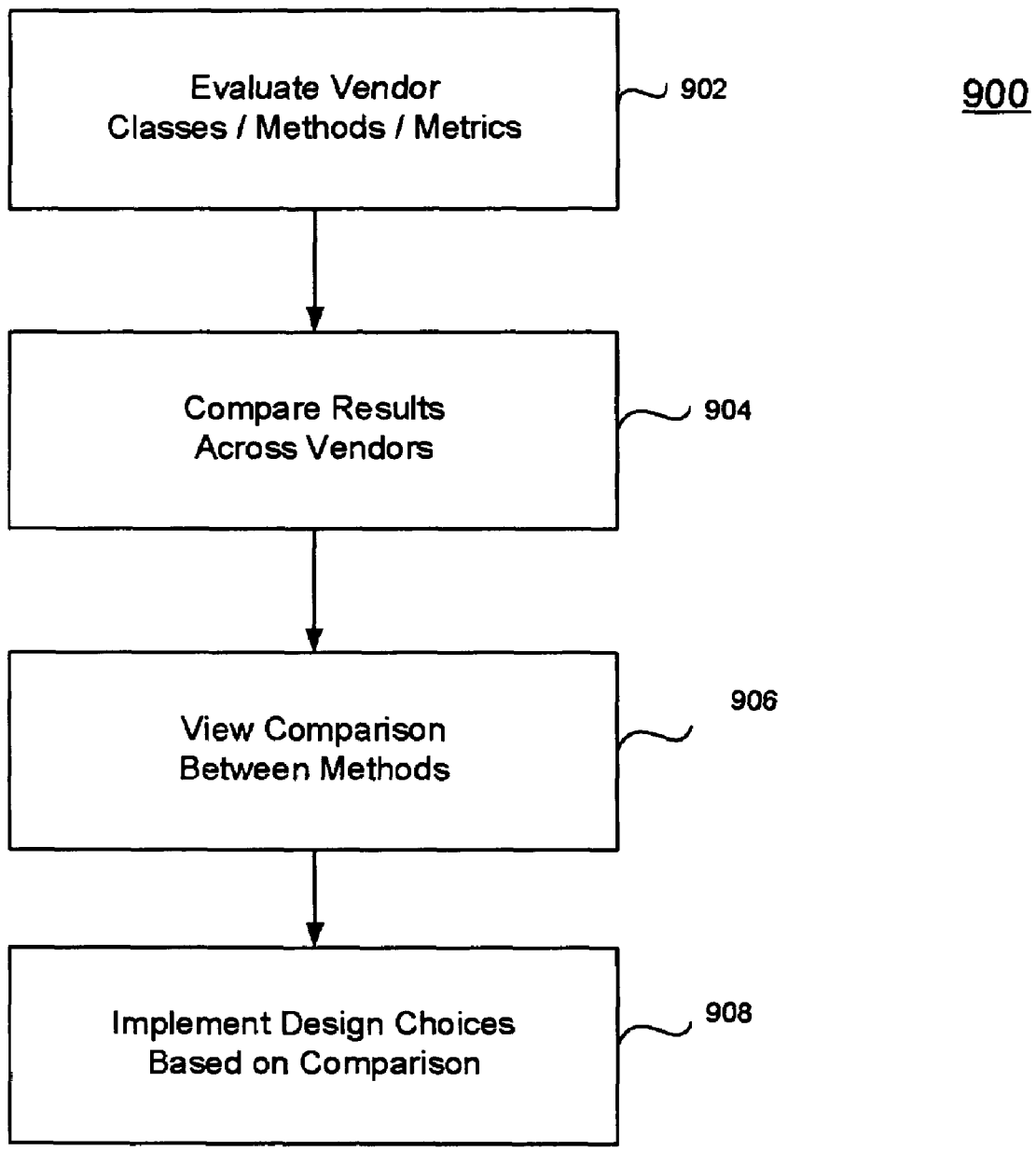
FIG. 9 shows a flow diagram of a process for evaluating vendor classes and methods within a standard implementation of a Java program to determine best practices across multiple vendors, in accordance with the preferred embodiment of the present invention.

With reference now to FIG. 9, there is shown a flow diagram of a process for evaluating vendor classes and methods within a standard implementation of a Java program to determine best practices across multiple vendors, in accordance with the preferred embodiment of the present invention. Process 900 begins at step 902, where the program designer evaluates each of the vendor classes, methods and metrics found and analyzed in process 800 to derive information about the design and optimization of each vendor's implementation. The program designer performs this evaluation by utilizing various data mining algorithms and statistical analysis applied to the database to determine an association between particular byte codes and the touted design features of the vendors' systems. In a preferred embodiment, step 902 is implemented by performing process 500 (See FIG. 5) on all vendor implementations touting a particular design characteristic to develop a decision tree 600 (See FIG. 6) indicating what method signatures 216, byte codes 218, and byte arguments 220 have a statistical frequency indicative of the vendor implementations having a particular design specification. In preferred embodiments, process 500 is performed using different performance metrics for comparison in development of the decision tree. For example, metrics may include the number of native calls, lines of code, number of local variables, classes/data structures used (standard classes), supporting classes, non-standard classes, supporting methods (non-standard methods), number of try/catch calls, etc. As will be appreciated, the tool user could use any number of performance metrics that indicated a given design characteristic for analyzing the vendor classes.

Figures 10, 11:
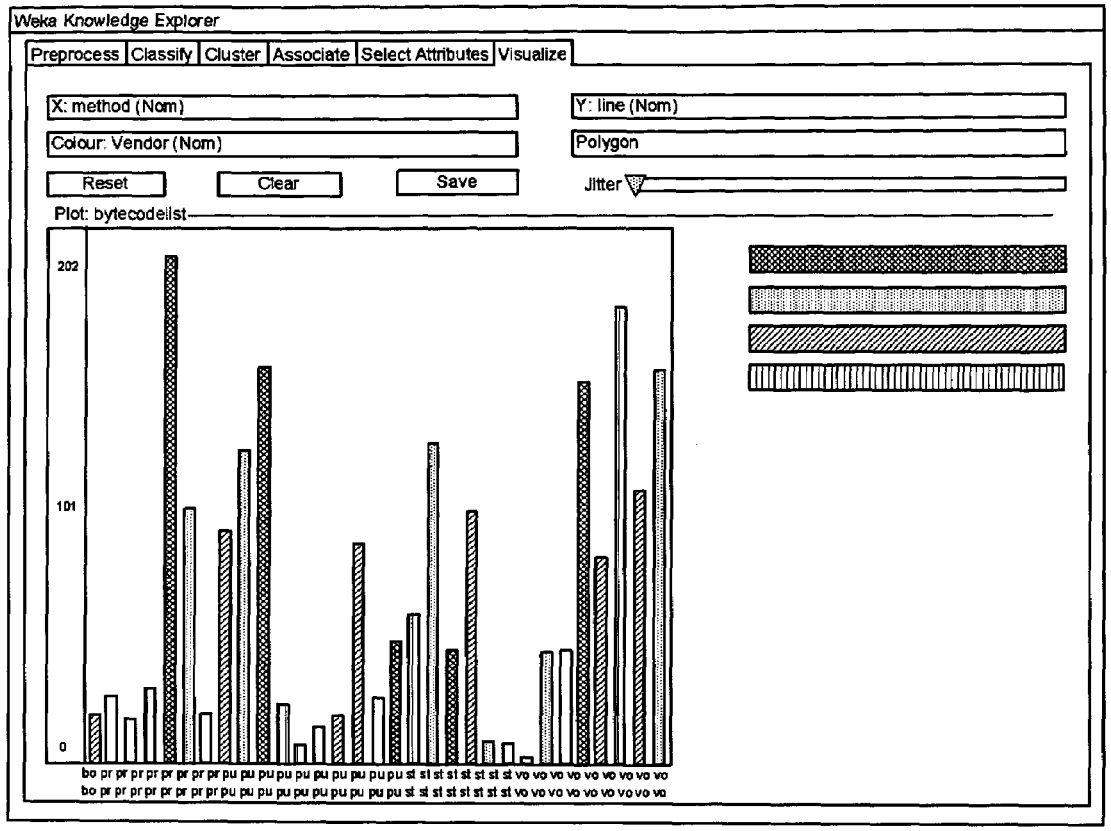
FIG. 10 shows an example of a possible output consisting of a histogram plot of common method signatures in the x-axis and the number of lines of code in the y-axis, in accordance with the preferred embodiment of the present invention.
FIG. 11 shows a table listing the resulting comparison of methods for one example of analysis of various vendor's "ClassLoader" classes, in accordance with the preferred embodiment of the present invention.

At step 904, the results of the evaluation for each of the vendor implementations in step 902 are compared across vendors. In one embodiment, this comparison is performed by calculating the number of lines of code required to implement a given method for each vendor's program. At step 906, this comparison of method implementations (per vendor) resulting from step 904 is viewed by the program designer using a graphical user interface. FIG. 10 shows an example of a possible output in step 906 consisting of a histogram plot of common method signatures in the x-axis and the number of lines of code in the y-axis. It can be seen that the number of lines of code required for each vendor (i.e., BEA, Sun, IBM, Caffe, Aegis) is shown for each of the method signatures (i.e., "pr," "pu," "st," "vo"). At step 908, design choices are inferred and implemented by the program designer by viewing the comparison. FIG. 11 shows a table listing the resulting comparison of methods for one example of analysis of various vendor's "ClassLoader" classes. The designer can make any number of design choices based on the comparison. The following are examples of assumptions and inferences that could be made from the comparison: a large number of native calls indicates a faster execution and less platform independence for the given implementation; a large number of lines of code indicates slower execution and a greater memory footprint for the program; a large data structures indicate slow operations; a large amount of supporting classes and methods indicates a level of decomposition and design patterns for a given implementation; the number of try/catch calls indicates the robustness of the class.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. A method for evaluating objects to determine best practices across different virtual machine vendors, the method comprising:

extracting class data from a plurality of objects originating from different virtual machine vendors having a particular design specification;

creating training data from the extracted class data of the plurality of objects, wherein said training data is created using a Database Mining Tool (DMT);

using the training data to create a definition of objects associated with the particular design specification;

characterizing the definition of objects using a decision tree, which indicates what method signatures, byte codes, and byte arguments have a statistical frequency indicative of a virtual machine vendor implementation with the particular design specification;

comparing the extracted class data with at least one other extracted class data of other objects across the different virtual machine vendors, based on predetermined performance metrics resulting from the definition;

outputting a result of the comparison as a function of one or more originating virtual machine vendors; and selecting among design choices in a customization of a software application, wherein said customization of said software application is implemented based on the comparison result of said different virtual machine vendors, and wherein the comparison result is derived from said training data.

2. The method according to claim 1, wherein the class data includes method signatures, byte codes and byte arguments for specific virtual machine vendor implementations of the different virtual machine vendors, wherein the class data are utilized as method information to generate the decision tree to perform said selecting.

3. The method according to claim 1, wherein the objects are classified as exhibiting the design specification according to user input.

4. The method according to claim 1, further comprising extracting class data from objects not exhibiting the design specification.

5. The method according to claim 1, wherein the class data is taken directly from a binary class file of the object, said method further comprising:

identifying whether a class loader is standard or non-standard;

performing pre-analysis on a sampling of class loaders.

6. The method according to claim 5, wherein a user provides the class data and said performing pre-analysis comprises:

selecting a random sample of a class type from among method entries;

segmenting the random sample into different sets of data types, including training data, validation data, and test data;

creating the decision tree utilizing the training data, wherein each node within the decision tree includes a listing of sampled virtual machine vendors and indicates an amount of sampled data associated with the node;

measuring a validity of the decision tree utilizing the validation data; and measuring one or more final results of the decision tree utilizing the test data.

7. The method according to claim 1, wherein a Java Virtual Machine processes Java objects.

\* \* \* \* \*

UNITED STATES PATENT AND TRADEMARK OFFICE
CERTIFICATE OF CORRECTION

PATENT NO. : 7,647,581 B2  Page 1 of 1
APPLICATION NO. : 10/881969
DATED : January 12, 2010
INVENTOR(S) : Atkin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this

Sixteenth Day of November, 2010

David J. Kappos
*Director of the United States Patent and Trademark Office*